Dec. 13, 1927.  A. H. OELKERS  1,652,633
BRAKE BEAM SAFETY SUPPORT
Filed Nov. 27, 1925  2 Sheets-Sheet 1
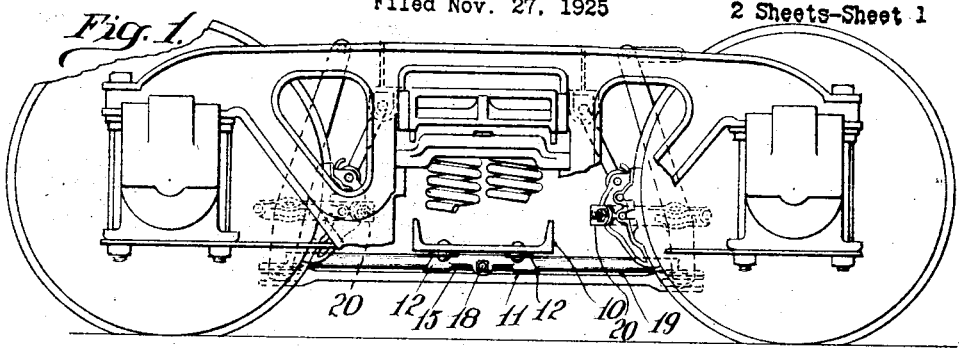
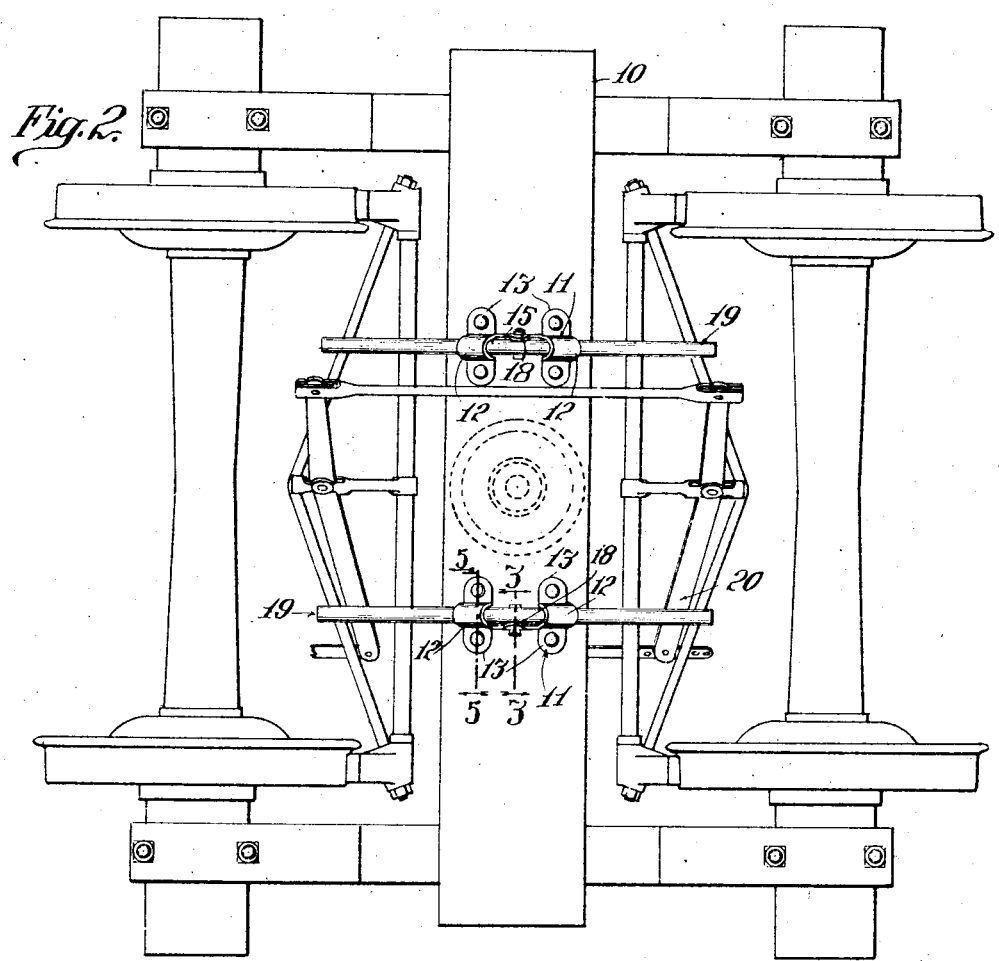

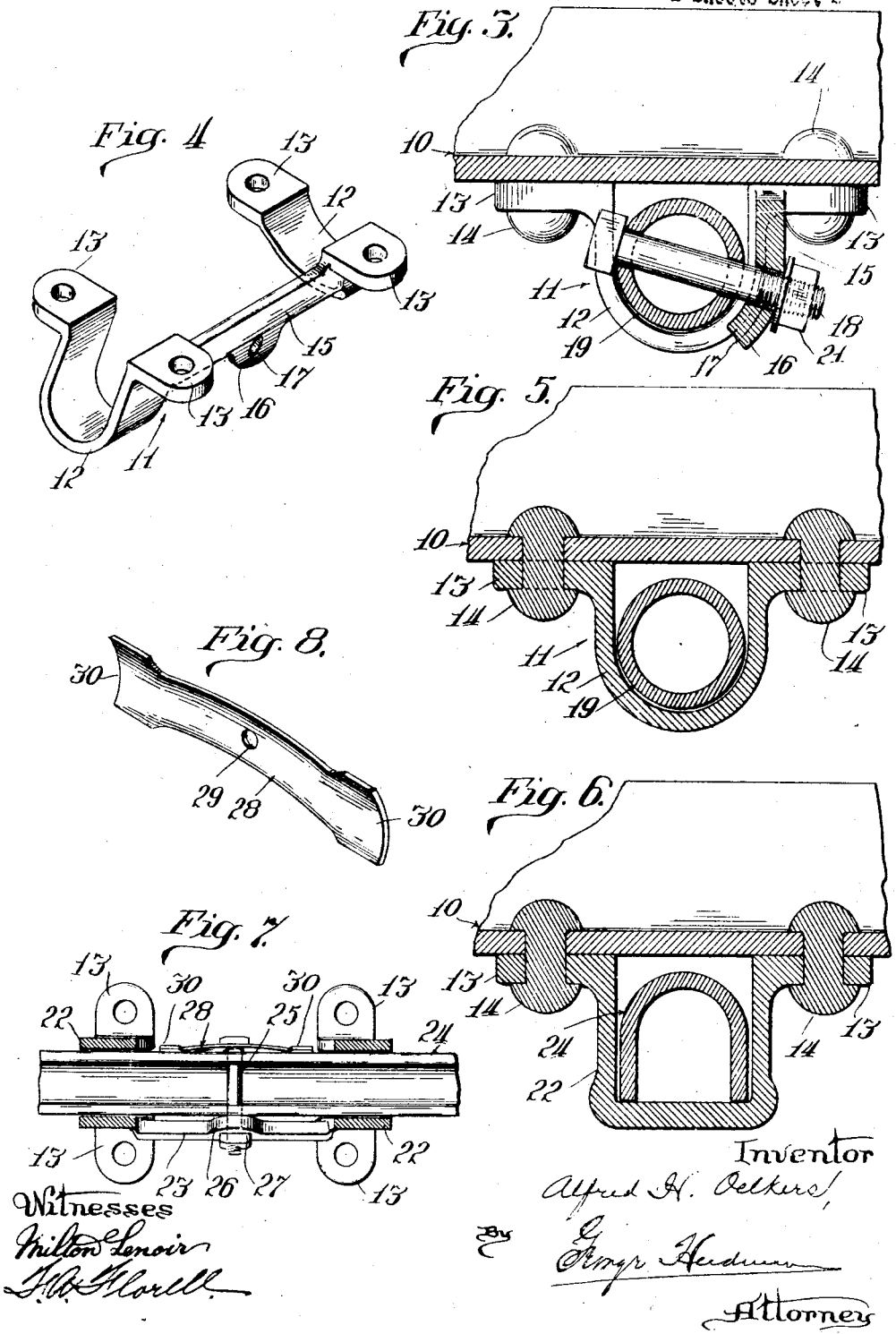

Patented Dec. 13, 1927.

1,652,633

UNITED STATES PATENT OFFICE.

ALFRED H. OELKERS, OF SPRINGFIELD, MISSOURI.

BRAKE-BEAM SAFETY SUPPORT.

Application filed November 27, 1925. Serial No. 71,548.

My invention relates to means adapted to be secured to the trucks of railroad cars, and more particularly to the type generally employed on freight cars, whereby the brake-beams, in the event of failure or breakage of the brake beam hanger or connections, will be supported and prevented from dropping onto the rails and causing serious accidents and possible derailment.

The object of my invention is to provide a safety guard or means which may be readily applied to car trucks in use without necessitating change in construction and without in any way interfering with the proper operation of the brake mechanism or in any way interfering with the proper functioning of other elements of the truck and running gear.

Another object of my invention is to provide a safety device or support which is comparatively cheap to manufacture and which may be easily installed, while at the same time providing an effective guard which may be readily removed when occasion requires to permit replacement of defective brake beams or other parts of the truck.

A further object of my invention is to provide means having the requisite strength to support the brake beams when necessary; the safety support being of suitable metal and of such simple arrangement and construction which will not get out of order under normal service conditions.

The above enumerated objects and advantages, as well as other advantages inherent in the construction, will all be readily comprehended from the following detailed description of the accompanying drawings, wherein:—

Figure 1 is an elevation of a truck and brake mechanism, portions being broken away, and showing my safety support applied.

Figure 2 is a bottom plan view of the truck showing certain of the brake beams while others are omitted and disclosing the application and position of my improved safety supports.

Figure 3 is a detail sectional view taken substantially on the line 3—3 of Figure 2.

Figure 4 is a detail perspective view of the bracket portion or member of my safety support.

Figure 5 is a detail sectional view taken substantially on the line 5—5 of Figure 2.

Figure 6 is a detail sectional view showing a modified form.

Figure 7 is a bottom longitudinal sectional plan of the modification shown in Figure 6.

Figure 8 is a detail in perspective of a tension member shown in connection with the construction in Figure 7.

My improved safety support is more especially adapted for use on railroad trucks as employed on freight cars and as the invention does not pertain to the truck construction nor to the brake mechanism per se, a detailed description of the truck and brake mechanism need not be entered into; the invention pertaining to means adapted to be preferably secured to the lower surface of the spring-plank 10 disposed transversely of the trucks as shown in Figures 1 and 2. The specific exemplification of my improved means, as disclosed in the first five figures of the drawings, comprises suitable yokes or bracket members generally indicated at 11, 11 in Figures 1 and 2, adapted to be riveted or otherwise suitably secured to the underside of the spring-plank of the truck and on opposite sides of the center as clearly shown in Figure 2.

The bracket members 11 preferably consist of the more or less U-shape portions or yokes 12; the ends whereof are bent outwardly as shown at 13, 13 and apertured to provide attaching points or ears whereby the bracket members are secured to the spring-plank 10, as for example by means of rivets shown at 14 in Figure 3.

The two bracket portions or yokes 12, at one side of the longitudinal center line of the composite member 11, are shown as preferably formed integral with the intermediate portion or plate 15. The intermediate portion or plate 15 is shown preferably enlarged to provide a lobe or central extension 16 which is apertured at 17 for the purpose of receiving a bolt 18 which is also intended to preferably pass through the supporting bar 19.

With the particular formation of the yokes or bracket portions 12, illustrated in the first five figures of the drawings, the supporting bars 19, for the sake of lightness, are shown tubular so as to have the necessary strength to properly support the brake-beams shown at 20, 20 in the event the latter become detached from their usual control members. The supporting bars 19 extend transversely of the spring-plank 10 and therefore in a direction longitudinally of the car and are of length sufficient to extend beyond the vertical planes of the brake-beams, see Figure 2.

The safety support is made of suitable metal having the requisite strength, while at the same time possessing a certain amount of resiliency, to permit the bracket members to be drawn-up taut into more or less gripping relation with the supporting bars 19, especially when the bolt 18 is inserted and fastened in place. I prefer to provide the supporting bars 19 with openings diametrically therethrough as shown in Figure 3, to receive the bolt 18 which also passes through the aperture 17 in the intermediate portion or plate 15. In practice, the bar 19 is arranged in the bracket member 11 so as to have the bolt 18 arranged at an angle or inclination to the horizontal, with the head of the bolt in contact with the support 19, while the nut 21 comes into contact with the lobe portion 16 of the intermediate portion or plate 15, as shown in Figure 3. With this arrangement, it is apparent that if the nut 21 is lost, bolt 18 will remain in place due to the inclination and the action of gravity. The bolt 18 prevents possibility of any longitudinal movement of the supporting bar 19.

The intermediate portion or plate 15 is preferably arranged and secured to the yoke portions 12 in such manner that the side of the intermediate portion 15 and its lobe 16 disposed toward the bar will provide clearance for insertion of the bar and normally be out of immediate contact therewith in order that fastening of the nut 21 on bolt 18 will induce a clamping or gripping action between the bracket members and the bar and thus hold the parts against vibration and chatter.

In Figures 6 and 7, I show a modified form of my improved safety support, wherein the yoke portions of the bracket member are more or less rectangular in cross-section or straight sided channel formation as shown at 22; it being understood that the yoke portions 22 are connected by means of the intermediate plate or portion 23 which may be substantially similar in construction to the intermediate portion or plate 15 shown in Figure 4.

The yoke portions of both bracket members shown in Figures 4 and 7, are shown preferably disposed slightly toward one side of the transverse axes of the lugs or lobes 13, in order that a firmer gripping relation with the supporting bars is obtained when the retaining bolts and nuts have been firmly secured in place.

The supporting bar in Figures 6 and 7 is shown in the nature of a U-shape channel bar 24, shown arranged with the open side of the bar disposed downwardly. The channel bar 24 is shown held against longitudinal movement by the bolt 25 which preferably passes through the supporting bar 24 and the bolt 25, like bolt 18, passes through an aperture formed in the lobe or lug portion 26 formed on the lower side of the intermediate portion or connecting plate 23; the bolt 25 being held in place by a nut 27.

In order to provide a firmer grip on the supporting bar 24, and to place the bolt and nut under tension so as to prevent possibility of vibration, I prefer to employ a spring plate member or elongated washer 28 shown in detail in Figure 8, with an aperture 29 to receive the bolt 25. The plate 28 is placed on the head end of the bolt as shown in Figure 7. The plate 28 is preferably formed with a slight longitudinal curvature, while the end portions 30, 30 are preferably provided with a slight transverse curvature so as to conform with the curved surface of the bars. With the intermediate apertured portion of the plate 28 out of normal alignment with the end portions 30, it is evident that when the nut on the retaining bolt is screwed up tightly into place, plate 28 will be caused to slightly flex into firm frictional relation at its ends with the sides of the supporting bars; the laterally enlarged ends 30 providing a greater bearing contact with the supporting bar. The spring plate 28 is adapted to extend between the yoke portions of the bracket members as shown in Figure 7 and will not only prevent possibility of chatter, but, in conjunction with the retaining bolt, will also prevent longitudinal movement of the supporting bar.

I have shown the bars of tubular or channel formation for the sake of lightness, while at the same time possessing the requisite strength, but it will be understood that these bars, as well as the bracket members, may be of any desired cross-sectional configuration; and other detail modifications may be made without, however, departing from the spirit of my invention.

What I claim is:

1. A brake-beam safety support, comprising a bar disposed transversely beneath the truck spring plank and the brake-beams of the truck, bar supporting means adapted to be secured transversely to the spring-plank of the truck and provided with sockets at the ends connected together by an intermediate resilient portion, and means adapted to pass through the bar and said intermediate portion whereby said intermediate portion is flexed and the socketed ends brought into gripping relation with said bar and the latter held against longitudinal movement.

2. A brake-beam safety support, comprising a bar disposed transversely beneath the truck spring-plank and the brake-beams, a bracket member disposed transversely of the spring-plank and secured adjacent to the front and rear longitudinal edges of the spring-plank, said member having bar receiving socket portions at each end connected by an intermediate portion disposed parallel with the bar, and means disposed through the bar and said intermediate portion.

3. A brake-beam safety support, comprising a bar disposed transversely beneath the truck spring-plank and the brake-beams on each side of the center of the truck, a bracket member for each bar disposed transversely beneath the spring-plank with its ends secured adjacent to both longitudinal edges of the plank, the ends of the bracket being formed to provide bar receiving sockets connected together by an intermediate portion disposed parallel with the bar, the bars and intermediate portions of the bracket members having registering holes, threaded bolts passing through the holes in the bars and intermediate portions, and nuts on the threaded ends of the bolts whereby a gripping relation between the bracket members and the bars is provided and longitudinal movement and vibration of the bars prevented.

4. A brake-beam safety support, comprising an apertured bar disposed transversely beneath the truck spring-plank and the brake-beams, a bracket member disposed transversely of and secured at its ends to the lower face of the spring-plank adjacent to the two longitudinal edges thereof, said member at its ends being formed with bar receiving yoke portions, connected together by an intermediate portion adapted to extend parallel with one side of the bar and apertured adjacent to its lower longitudinal edge, a threaded bolt passing at an inclination through the apertures of the bar and said intermediate portion, and means engaging with the threaded end of the bolt whereby the bar and said portion are forced into firm relation with each other and vibration and longitudinal movement of the bar prevented.

5. A brake-beam safety support, comprising a bar disposed transversely beneath the truck spring-plank and the brake-beams, a bracket member disposed transversely of and secured at its ends to the bottom of the spring-plank adjacent to the two longitudinal edges thereof, the ends of said member being formed to provide bar encircling portions connected together by an integral intermediate portion disposed lengthwise of the bar, and means disposed transversely of the bar and said intermediate portion whereby a transverse stress on the bar is provided and longitudinal movement and vibration of the bar prevented.

6. A brake-beam safety support, comprising an apertured bar disposed transversely beneath the truck spring-plank and the brake-beams, a bracket member disposed transversely of and secured to the bottom of the spring-plank adjacent to the two longitudinal edges thereof, the ends of said member being formed to provide bar encircling portions, connected together by an off-set portion disposed lengthwise of the bar and apertured adjacent to the lower longitudinal edge, a bolt passing through the apertures of the bar and said off-set portion in an inclining manner with the head adjacent to the upper side of the bar, and means engaging the lower end of the bolt whereby the bar and said off-set portion are drawn into firm relation with each other.

7. A brake-beam safety support, comprising a bar disposed transversely beneath the brake-beams at the same end of the car truck, bar supporting means adapted to be secured to the truck, consisting of spaced bar receiving socket forming portions and a connecting portion integral at its ends with the socket portions, and means adapted to engage with said connecting portion and the bar whereby the bar is held against longitudinal movement.

8. A brake beam safety support, comprising bars arranged to extend transversely beneath the brake-beams of a car-truck, means adapted to be secured to the spring-plank of the car-truck, composed of U-shaped end portions adapted to fit about said bars and a connecting portion integral with the end portions at one side of the longitudinal center line of said means, and retaining means adapted to engage with said connecting portion and the bar whereby longitudinal movement of the latter is prevented.

9. A brake-beam safety support, comprising a bar arranged to extend transversely beneath the brake-beams at the same end of a car-truck, means adapted to be secured to the spring-plank of the car-truck, composed of U-shaped end portions adapted to receive the bars and a connecting plate integral with the end portions at one side of the longitudinal center line of said means, a spring plate adapted to extend longitudinally of the bars intermediate of the U-shaped end portions, and a retaining bolt passing through said spring plate on one side of the bar and said connecting plate on the other side of the bar, whereby the bar is held against longitudinal movement.

ALFRED H. OELKERS.